United States Patent
Monacchi et al.

(10) Patent No.: US 12,210,721 B2
(45) Date of Patent: Jan. 28, 2025

(54) DYNAMIC QUEUE LIMIT FOR CHAT SUPPORT

(71) Applicant: GRABTAXI HOLDINGS PTE. LTD., Singapore (SG)

(72) Inventors: Elisa Monacchi, Pesaro (IT); Suman Anand, Singapore (SG); Namita Bhatia, Singapore (SG); Ebralyn Gumaua, Manila (PH)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 0 days.

(21) Appl. No.: 18/561,454

(22) PCT Filed: Jun. 8, 2022

(86) PCT No.: PCT/SG2022/050393
§ 371 (c)(1),
(2) Date: Nov. 16, 2023

(87) PCT Pub. No.: WO2022/260597
PCT Pub. Date: Dec. 15, 2022

(65) Prior Publication Data
US 2024/0259335 A1  Aug. 1, 2024

(30) Foreign Application Priority Data
Jun. 9, 2021  (SG) .......................... 10202106165U

(51) Int. Cl.
*G06F 3/0481* (2022.01)
*H04L 51/04* (2022.01)
*H04L 51/212* (2022.01)

(52) U.S. Cl.
CPC .......... *G06F 3/0481* (2013.01); *H04L 51/04* (2013.01); *H04L 51/212* (2022.05)

(58) Field of Classification Search
None
See application file for complete search history.

(56) References Cited

U.S. PATENT DOCUMENTS

2006/0242232 A1* 10/2006 Murillo ............... H04L 12/1813 709/204
2007/0061405 A1* 3/2007 Keohane ............. G06Q 10/109 709/207

(Continued)

OTHER PUBLICATIONS

Singapore Examination Report dated May 14, 2024 which was issued in connection with SG Patent Application No. 10202106165U.

(Continued)

*Primary Examiner* — Mong-Shune Chung
(74) *Attorney, Agent, or Firm* — Buckley, Maschoff & Talwalkar LLC

(57) ABSTRACT

Aspects concern a computer-implemented method for controlling access to a chat support system, the method comprising: determining whether a queue limit for a chat support queue of the chat support system will be exceeded by adding a further user to the chat support queue; and preventing that a user interface access to the chat support system is provided for the further user in case it is determined that the queue limit for the chat support queue will be exceeded by adding the further user to the chat support queue.

15 Claims, 8 Drawing Sheets

(56) References Cited

U.S. PATENT DOCUMENTS

| | | | |
|---|---|---|---|
| 2008/0172471 A1* | 7/2008 | Berstis | G06Q 10/107 709/206 |
| 2012/0297321 A1* | 11/2012 | Douglas | H04L 51/043 715/758 |
| 2015/0381931 A1* | 12/2015 | Uhma | G06F 3/0481 348/14.03 |
| 2018/0095612 A1* | 4/2018 | Rapp | G06F 3/04817 |

OTHER PUBLICATIONS

International Search Report and Written Opinion dated Jan. 5, 2023 which was received in connection with PCT/SG2022/050393.

* cited by examiner

DYNAMIC QUEUE LIMIT FOR CHAT SUPPORT

This application is a US National Stage application pursuant to 35 USC § 371 claiming benefit of and priority to International Application No. PCT/SG2022/050393, filed on Jun. 8, 2022, and claiming benefit of and priority to Singapore application Ser. No. 10/202,106165U filed on Jun. 9, 2021, each of which are hereby incorporated by reference herein in their entirety.

TECHNICAL FIELD

Various aspects of this disclosure relate to devices and methods for controlling access to a chat support system, particularly for controlling access to a chat support system using a dynamic queue limit for chat support.

BACKGROUND

In the field of chat support queues, a problem may arise in that users in the corresponding chat support queue may have to wait for a long time until they are served by a service agent, e.g. in case when only few service agents serve users and/or when excessively many users are in the chat support queue. To avoid this, a limit so as to limit the number of users waiting in the chat support queue can be applied. However, the application of such a limit still entails a problem in that, e.g., a button for joining the chat support queue is also shown, when the limit has already been reached and when clicking on the button would lead to the access to the chat support queue being denied. Thereby, a user satisfaction may be deteriorated.

Accordingly, it is desirable to provide a method for controlling access to a chat support system by which a number of accesses to the chat support system that do not result in an actual chat are reduced.

SUMMARY

Various embodiments concern a computer-implemented method for controlling access to a chat support system, the method comprising: determining whether a queue limit for a chat support queue of the chat support system will be exceeded by adding a further user to the chat support queue; and preventing that a user interface access to the chat support system is provided for the further user in case it is determined that the queue limit for the chat support queue will be exceeded by adding the further user to the chat support queue.

According to one embodiment, the method further comprises: providing the user interface access to the chat support system to the further user in case it is determined that the queue limit for the chat support queue will not be exceeded by adding the further user to the chat support queue.

According to one embodiment, providing the user interface access to the chat support system to the further user comprises displaying on a display, a user interface portion, wherein operation of the user interface portion triggers adding the further user to the chat support queue.

According to one embodiment, preventing that the user interface access to the chat support system is provided for the further user comprises non-displaying on a display, a user interface portion, wherein operation of the user interface portion triggers adding the further user to the chat support queue.

According to one embodiment, preventing that the user interface access to the chat support system is provided for the further user comprises displaying on a display, a user interface portion, wherein the user interface portion indicates that the chat support system is currently not available, and comprises configuring the user interface portion not to trigger adding the further user to the chat support queue.

According to one embodiment, the method further comprises: determining the queue limit for the chat support queue based on a total number of chat requests that have arrived in the chat support queue in a predefined time period; and/or a total number of chats in the chat support queue that have been closed in a predefined time period.

According to one embodiment, the method further comprises: determining the queue limit for the chat support queue based on a total number of chat requests that have arrived in the chat support queue in a predefined time period divided by a total number of chats in the chat support queue that have been closed in the predefined period.

According to one embodiment, the chat support queue comprises at least one chat request input by a user; and the method further comprises: determining a number of service agents present in the chat support, wherein each service agent processes a chat request of the at least one chat request; and determining the queue limit for the chat support queue based on the determined number of service agents.

According to one embodiment, the method further comprises: determining a number of cases handled in parallel by each service agent present in the chat support queue; and determining the queue limit for the chat support queue based on the determined number of service agents and the determined number of cases handled in parallel by each service agent.

According to one embodiment, the method further comprises: determining an average number of chats handled per service agent in the chat support queue in a further predefined time period; and determining the queue limit for the chat support queue based on the determined average number of chats handled per service agent.

According to one embodiment, the method further comprises: determining an average waiting time per chat request in the chat support queue before the processing of the respective chat request has been started; and determining the queue limit for the chat support queue based on the determined average waiting time per chat request in the chat support queue.

According to one embodiment, the method further comprises: determining an average processing time per chat request in the chat support queue; and determining the queue limit for the chat support queue based on the determined average processing time per chat request in the chat support queue.

According to one embodiment, the chat support queue comprises at least one chat request input by a user; and the method further comprises: determining a total number of chat requests that have arrived in the chat support queue in a predefined time period; determining a total number of chats in the chat support queue that have been closed in a predefined time period; determining a number of service agents present in the chat support, wherein each service agent processes a chat request of the at least one chat request; determining a number of cases handled in parallel by each service agent present in the chat support queue; determining an average number of chats handled per service agent in the chat support queue in a further predefined time period; determining an average waiting time per chat request in the chat support queue before the processing of the respective chat request has been started; determining an average processing time per chat request in the chat support queue; determining the queue limit as: (a/b)*(c*d)*e*(f+g) with: a: the determined total number of chat requests that have arrived in the chat support queue in the predefined time period; b: the determined total number of chats in the chat support queue that have been closed in the predefined time period; c: the determined number of service agents present in the chat support; d: the determined number of cases handled in parallel by each service agent present in the chat support queue; e: the determined average number of chats handled per service agent in the chat support queue in the further predefined time period; f: the determined average waiting time per chat request in the chat support queue before the processing of the respective chat request has been started; and g: the determined average processing time per chat request in the chat support queue.

By the method for controlling access to a chat support system described above, it is possible to reduce a waiting time for users in the chat support queue. Further, it is possible to allow only users to join the chat support queue that can be supported within a short time frame, thereby ensuring a faster support time and reducing agent effort on unresponsive chats.

According to one embodiment, a server computer is provided comprising a communication interface, a memory interface and a processing unit configured to perform the method for controlling access to a chat support system described above.

According to one embodiment, a computer program element is provided comprising program instructions, which, when executed by one or more processors, cause the one or more processors to perform the method for controlling access to a chat support system described above.

According to one embodiment, a computer-readable medium is provided comprising program instructions, which, when executed by one or more processors, cause the one or more processors to perform the method for controlling access to a chat support system described above.

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the devices or methods are analogously valid for the other devices or methods. Similarly, embodiments described in the context of a device are analogously valid for a vehicle or a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

In the following, embodiments will be described in detail.

Figure 1:
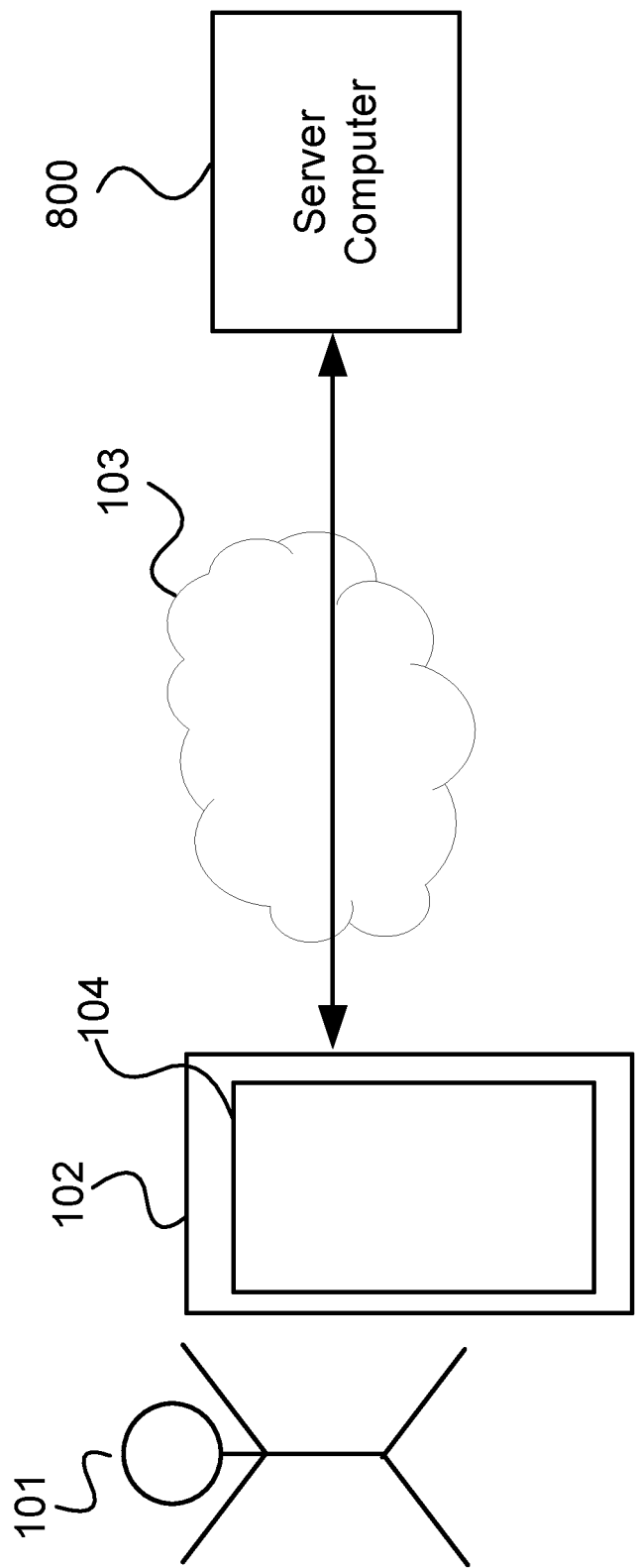
FIG. 1 shows an overview of a communication structure in a chat support system.

As can, e.g., be seen from FIG. 1, a user 101 can access content provided by a server computer 800. The content can be displayed with a user interface 104, e.g. in a mobile app and/or on a website, using a client device 102. Here, data is transmitted between the client device 102 and the server computer 800 by a data transmission connection 103, e.g. via the Internet.

The user 101 may access the content (e.g. a helpsite, e.g. a help/support article) since he needs support/assistance on a specific topic. However, the content may not be sufficient and, hence, the user 101 may need further support/assistance, e.g. (to be) provided by a service agent (real person or chat bot).

Figure 2:
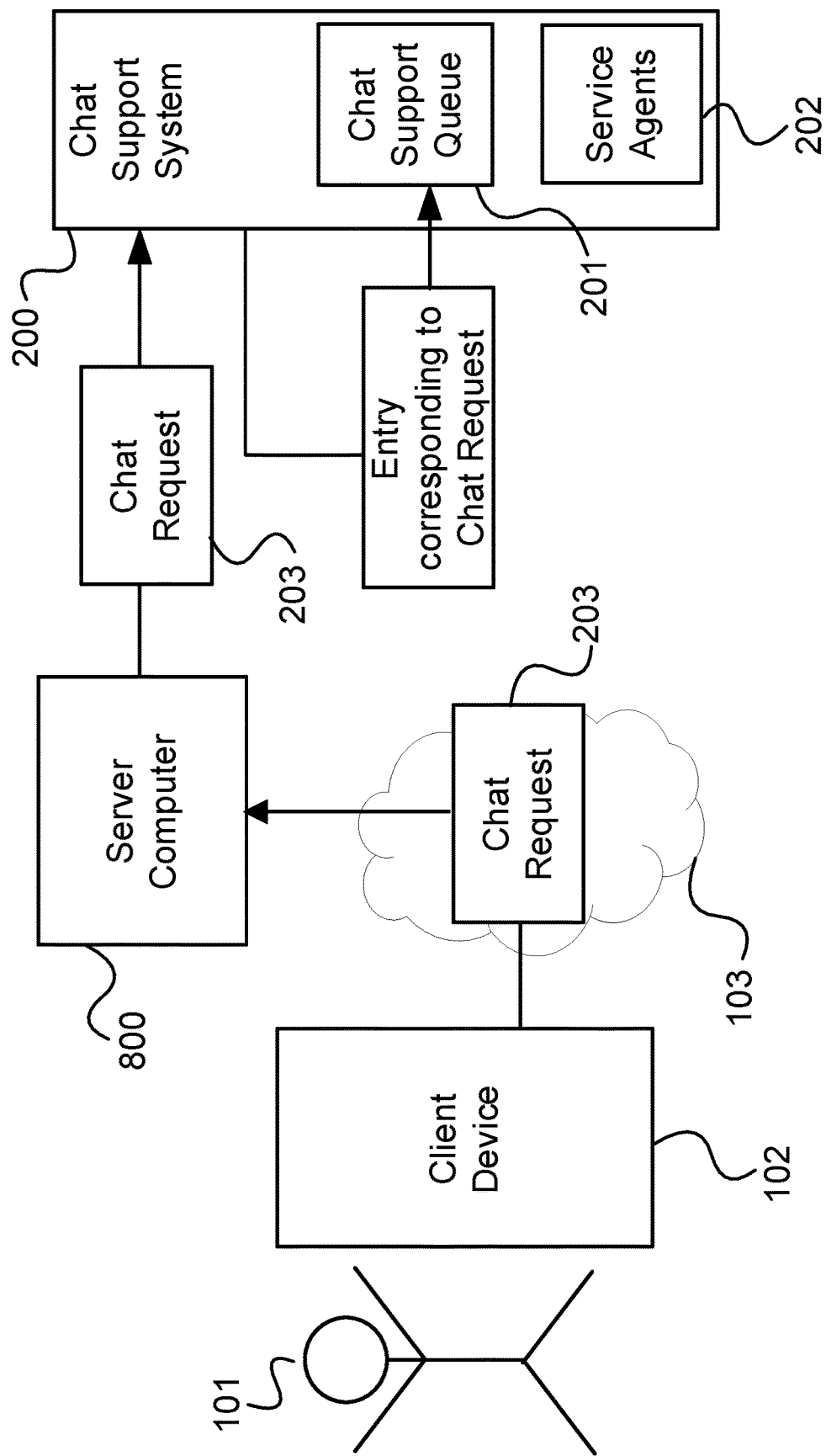
FIG. 2 shows the chat support system.

As is, e.g., shown in FIG. 2, such further support/assistance may, e.g., be provided by a chat support system 200. The chat support system 200 may, e.g., be provided by the server computer 800. The chat support system 200 may be provided so as to allow communication (e.g. in written form) between the user 101 and a service agent 202 (real person or chat bot). The chat support system 200 may comprise a chat support queue 201 and a table of service agents 202 processing chat requests input by users (e.g. by the user 101). In other words, the table of service agents 202 may contain a corresponding entry for each of the service agents 202 being currently active in the chat support system 200 to process chat requests. The user 101 may submit a chat request 203 from the client device 102 via the data transmission connection 103 to the server computer 800 (e.g. by operation of a corresponding user interface portion, e.g. by operation of a corresponding button, on a display of the client device 102). The submitted chat request 203 may be received by the server computer 800 and be processed by the chat support system 200. The chat support system 200 may then create an entry corresponding to the chat request 203 in the chat support queue 201. Once the chat request 203 is the next chat request to be processed (e.g. when it is on the first position in the chat support queue 201), it may be processed by a(n available) service agent.

In a case when there are excessively many chat requests in the chat support queue 201 (e.g. when the chat support queue 201 contains excessively many corresponding entries) and/or when the table of service agents 202 only has few entries (e.g. when only few service agents are currently active to process chat requests), long waiting times for users waiting for their chat request to be processed can occur. To solve this problem, a limit for limiting the number of entries in the chat support queue 201 may be introduced. Thereby, if the limit should be exceeded by a further entry being added to the chat support queue 201 (i.e. by a further chat request being accepted), the chat support system 200 denies the corresponding chat request and, therefore, the chat support system 200 does not create a corresponding entry in the chat support queue 201. In other words, the user 101 might still submit a chat request 203 (e.g. by operation of a corresponding user interface portion), but no entry corresponding to the chat request 203 would be added to the chat support queue 201 and the user 101 might be notified about his submitted chat request 203 having been denied. However, this may deteriorate a user satisfaction and increase a user frustration since the user is only informed about the chat request being denied after having tried to access the chat support system.

Therefore, a method for controlling access to the chat support system 200 according to various embodiments is provided which ensures a lower waiting time for support by introducing a dynamic queue limit. Here, the queue limit may, e.g., be recalculated every time a (further) user 101 enters a help center article with a live chat option and, after comparing the (dynamic) queue limit with a number of users already in the chat support queue 201, it is determined if an entry point for chat should be shown or not. Consequently, only users 101 are allowed in the chat support queue 201 for which the chat support system 200 is confident that the users 101 can be supported within a short time frame, ensuring a faster support time and reducing agent effort on unresponsive chats.

Figure 3:
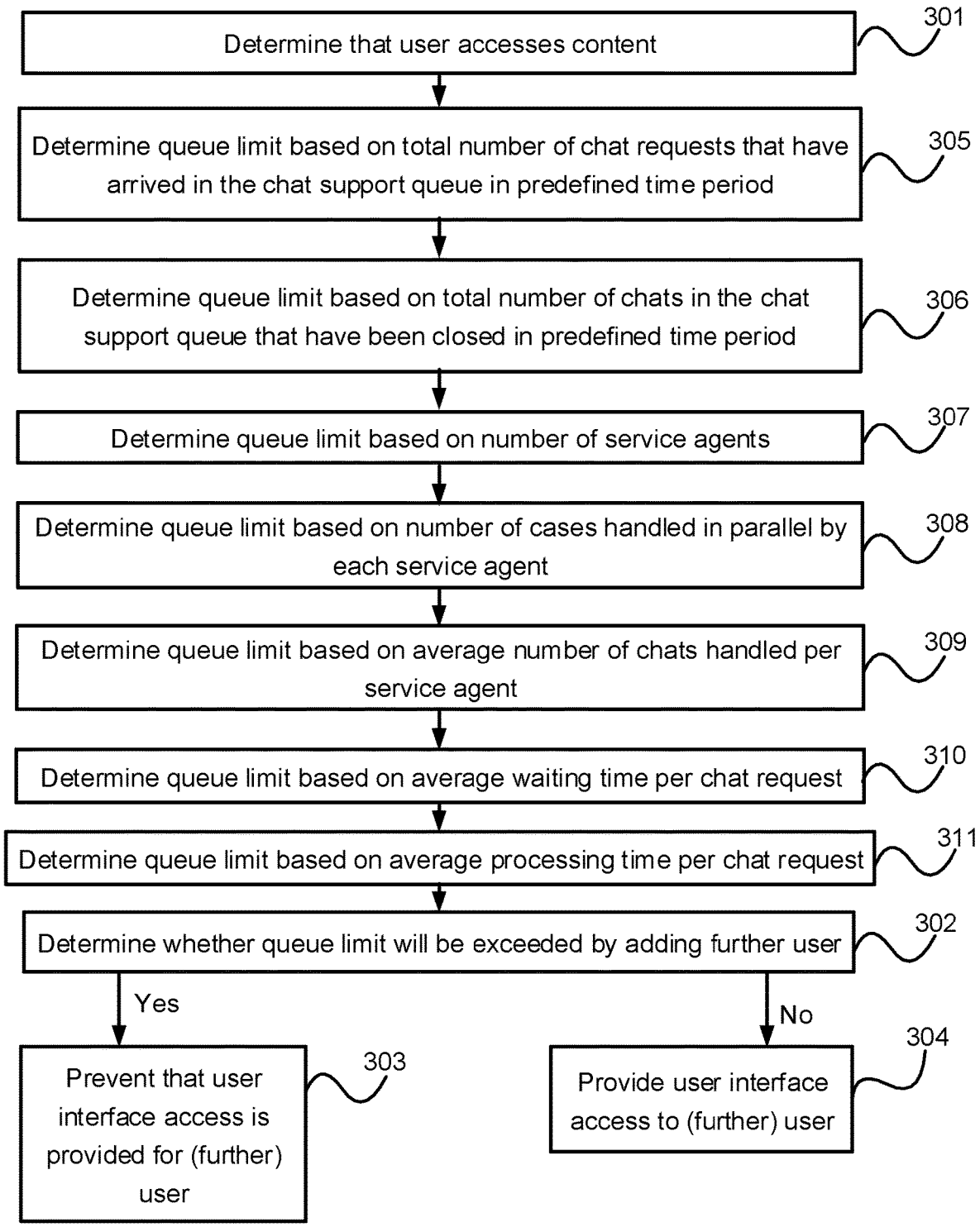
FIG. 3 is a flow diagram showing a method for controlling access to the chat support system according to various embodiments.

The method for controlling access to the chat support system 200 according to one embodiment is exemplarily shown in FIG. 3.

Each time the (further) user 101 accesses content in respect to which access to the chat support system 200 might generally be offered, the method for controlling access to the chat support system 200 is executed.

That is, upon the user 101 accessing the respective content (301), the server computer 800 determines whether a queue limit for a chat support queue of the chat support system will be exceeded by adding an entry corresponding to the (further) user 101 to the chat support queue 201 (302). If it is determined, by the server computer 800, that the queue limit for the chat support queue 201 will be exceeded by adding an entry corresponding to the (further) user 101 to the chat support queue 201 (302), the server computer 800 prevents that a user interface access to the chat support system 200 is provided for the (further) user 101 (303). However, if is determined, by the server computer 800, that the queue limit for the chat support queue 201 will not be exceeded by adding an entry corresponding to the (further) user 101 to the chat support queue 201 (302), the server computer 800 provides to the (further) user 101 the user interface access to the chat support system 200 (304).

In the context of this application, according to various embodiments, the term "user interface access" may, e.g., be understood as accessing the chat support system 200 via the user interface 104 (e.g. by clicking on a corresponding button, e.g. by clicking on a corresponding button labelled with "Click here to chat", e.g. by clicking on a corresponding button labelled with "Chat with us"). Accordingly, providing the user interface access to the chat support system may be understood as providing the (further) user 101 with a user interface portion via which the (further) user 101 can access the chat support system 200.

Figure 4:
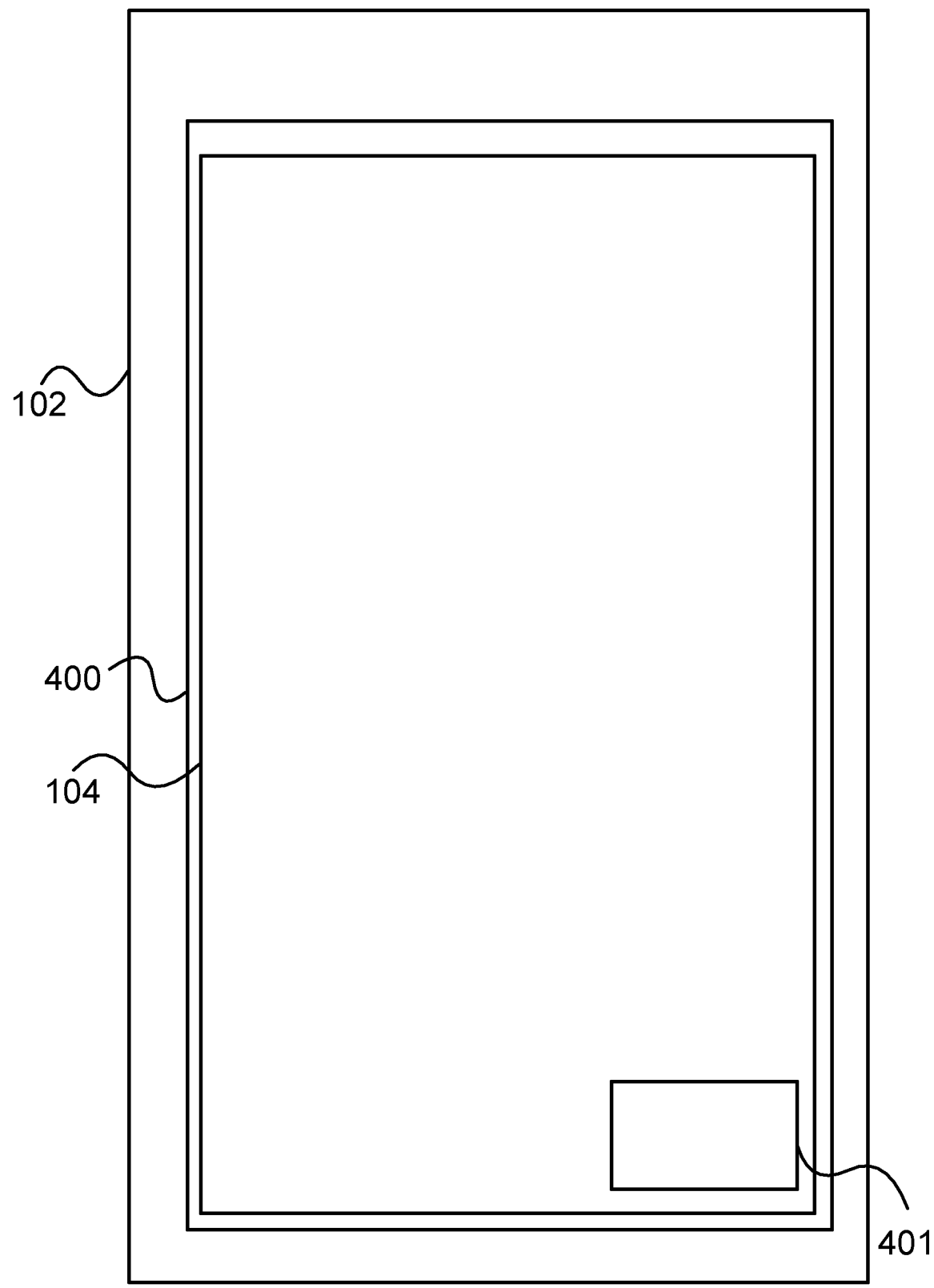
FIG. 4 shows a user interface portion displayed on a display.

As can, e.g., be seen from FIG. 4, providing the user interface access to the chat support system 200 to the (further) user 101 may be realized, e.g., by displaying on a display 400 (e.g. a display 400 of the client device 102), a user interface portion 401 being part of the user interface 104, wherein operation of the user interface portion 401, e.g. by the user 101, triggers the chat support system 200 to add an entry corresponding to the (further) user 101 to the chat support queue 201. That is, e.g., a button 401 to initiate a chat may be displayed to the (further) user 101 on the display 400, wherein it is ensured that the button 401 is only shown to the (further) user 101 when operating the button 401 successfully triggers the chat support system 200 to add an entry corresponding to the (further) user 101 to the chat support queue 201.

Figure 5:
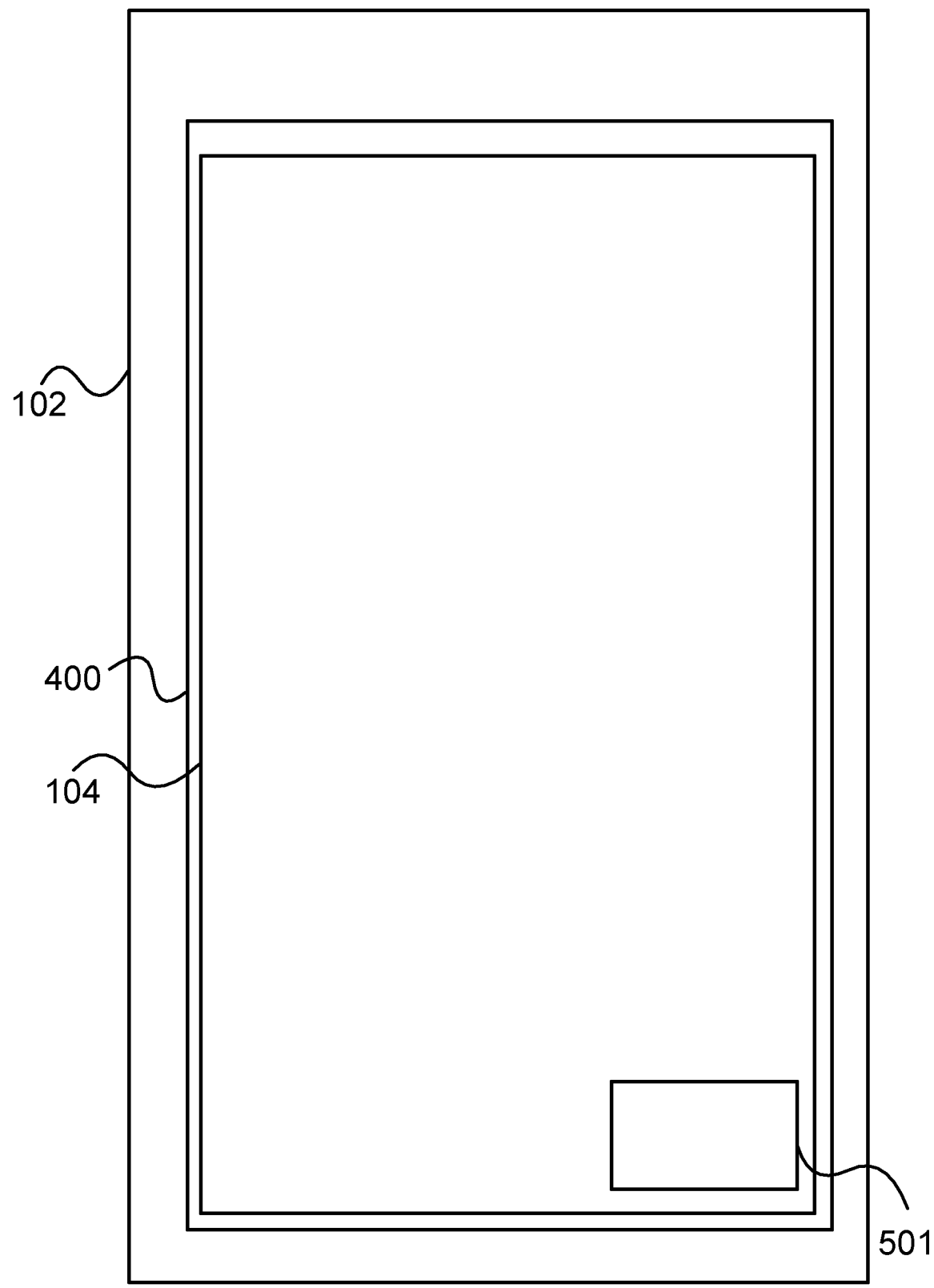
FIG. 5 shows a user interface portion displayed on a display.

As can, e.g., be seen from FIG. 5, preventing that the user interface access to the chat support system 200 is provided for the (further) user 101 may be realized by displaying on the display 400 (e.g. the display 400 of the client device 102), a user interface portion 501, wherein the user interface portion 501 indicates that the chat support system 200 is currently not available (i.e. the interface portion 501 is indicative for the fact that the queue limit for the chat support queue 201 will be exceeded by adding the (further) user 101 to the chat support queue 201), and by configuring the user interface portion 501 not to trigger adding the (further) user 101 to the chat support queue 201 (i.e. disabling a functionality that operation of the user interface portion 501 triggers adding the (further) user 101 to the chat support queue 201). That is, the (further) user 101 is shown on the display 400 and/or the user interface 104 the user interface portion 501 informing the (further) user 101 that the chat support system 200 cannot be accessed at that time, e.g. by displaying a button labelled with "Queue is full. Please try after some time.". Further, the user interface portion 501 does not have any effect related to accessing the chat support system 200 and/or creating an entry corresponding to a chat request in the chat support queue 201, i.e. a functionality that operation of the user interface portion 501 triggers adding the (further) user 101 to the chat support queue 201 is disabled. In other words, the (further) user 101 is directly informed that the chat support system 200 cannot be accessed at that time without having to take further action (e.g. first clicking on a button and being informed afterwards). Thereby, a user frustration may be reduced.

Figure 6:
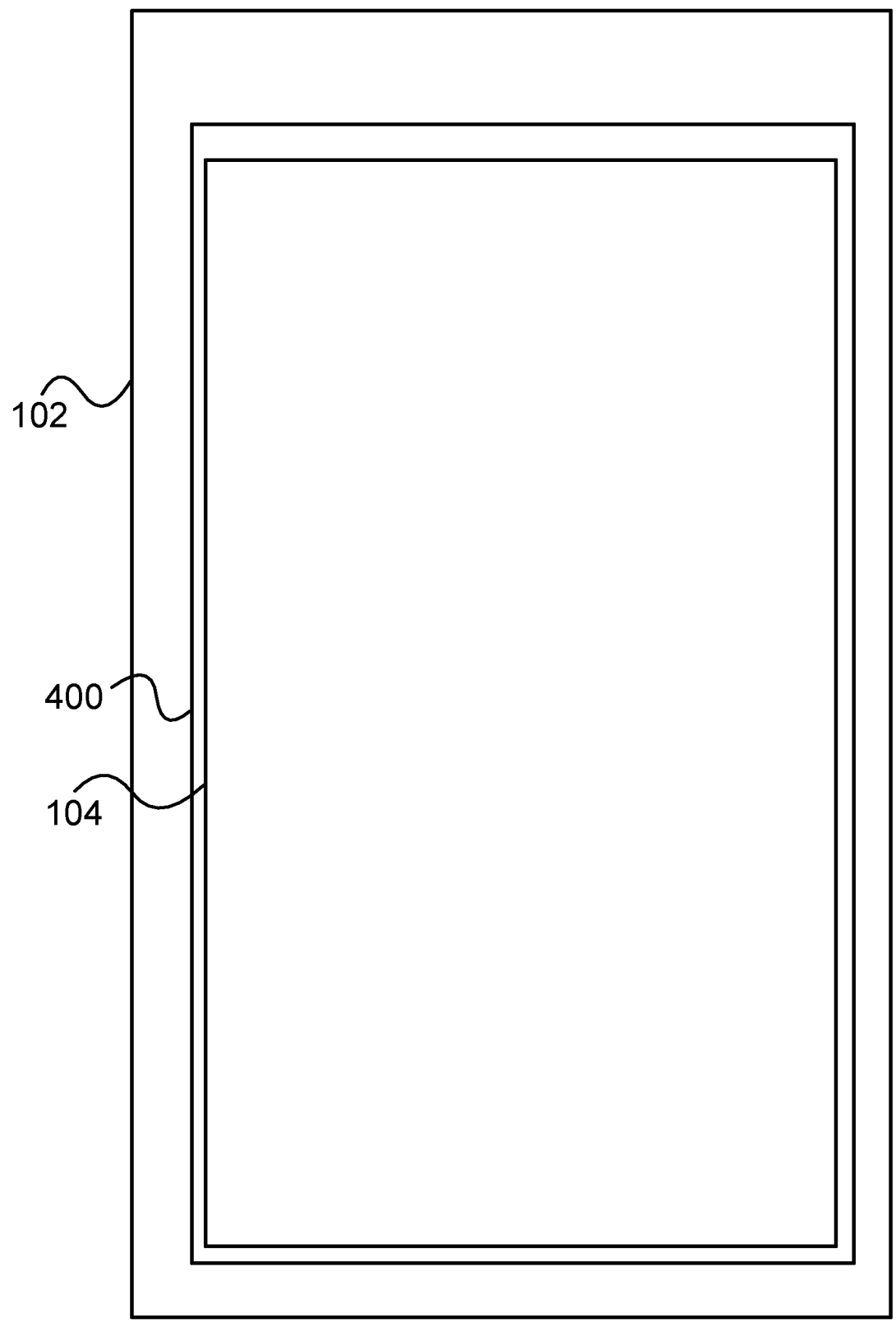
FIG. 6 shows a user interface portion not displayed on the display.

As can, e.g., be seen from FIG. 6, preventing that the user interface access to the chat support system 200 is provided for the (further) user 101 may be realized by non-displaying on the display 400 (e.g. the display 400 of the client device 102), a user interface portion, wherein operation of the user interface portion triggers the chat support system 200 to add an entry corresponding to the (further) user 101 to the chat support queue 201. That is, the (further) user 101 is not shown anything on the display 400 and/or the user interface 104 related to initiating a chat. In other words, the (further) user 101 does not even take notice of a chat support system 200 being implemented in this case. Thereby, a user frustration may be reduced.

As is, e.g., shown in FIG. 3, the server computer 800 may determine the queue limit for the chat support queue 201 based on a total number of chat requests that have arrived in the chat support queue 201 in a predefined time period (e.g. within the last hour) (305), and/or a total number of chats in the chat support queue 201 that have been closed in a predefined time period (e.g. within the last hour) (306).

Specifically, the server computer 800 may determine the queue limit for the chat support queue 201 based on a total number of chat requests that have arrived in the chat support queue 201 in a predefined time period (e.g. within the last hour) divided by a total number of chats in the chat support queue 201 that have been closed in the predefined period.

According to one embodiment, if the quotient of the total number of chat requests that have arrived in the chat support queue 201 in the predefined time period divided by the total number of chats in the chat support queue 201 that have been closed in the predefined period exceeds a value of one, this quotient is set to have a value of one.

Further, the server computer 800 may determine a number of service agents present in the chat support (i.e. a number of entries of the table of service agents 202, i.e. a proficiency in the chat support), and the server computer 800 may determine the queue limit for the chat support queue 201 based on the determined number of service agents (307).

Further, the server computer 800 may determine a number of cases handled in parallel by each service agent present in the chat support queue 201 (i.e. a concurrency for each service agent present in the chat support queue 201), and the server computer 800 may determine the queue limit for the chat support queue 201 based on the determined number of service agents and the determined number of cases handled in parallel by each service agent (308).

Here, the server computer 800 may determine the sum of the number of cases handled in parallel by a respective service agent present in the chat support queue 201 over the number of service agents present in the chat support. In that case, the server computer 800 may determine the queue limit for the chat support queue 201 based on the determined sum.

Further, the server computer 800 may determine an average number of chats handled per service agent in the chat support queue 201 in a further predefined time period (e.g. within one hour), and the server computer 800 may determine the queue limit for the chat support queue 201 based on the determined average number of chats handled per service agent (309).

Further, the server computer 800 may determine an average waiting time per chat request in the chat support queue 201 before the processing of the chat request has been started, and the server computer 800 may determine the queue limit for the chat support queue 201 based on the determined average waiting time per chat request in the chat support queue 201 (310). The determined average waiting time per chat request in the chat support queue 201 may, e.g., be a value expressed in units of the predefined time period and/or the further predefined time period (e.g. in hours without having a unit).

Further, the server computer 800 may determine an average processing time per chat request in the chat support queue 201, and the server computer 800 may determine the queue limit for the chat support queue 201 based on the determined average processing time per chat request in the chat support queue 201. The determined average processing time per chat request in the chat support queue 201 may, e.g., be a value expressed in units of the predefined time period and/or the further predefined time period (e.g. in hours without having a unit).

Further, according to one embodiment, the server computer 800 may determine a total number of chat requests that have arrived in the chat support queue 201 in a predefined time period (e.g. within one hour), the server computer 800 may determine a total number of chats in the chat support queue 201 that have been closed in a predefined time period (e.g. within one hour), the server computer 800 may determine a number of service agents present in the chat support, the server computer 800 may determine a number of cases handled in parallel by each service agent present in the chat support queue 201, the server computer 800 may determine an average number of chats handled per service agent in the chat support queue 201 in a further predefined time period (e.g. within one hour), the server computer 800 may determine an average waiting time per chat request in the chat support queue 201 before the processing of the respective chat request has been started, the server computer 800 may determine an average processing time per chat request in the chat support queue 201, and the server computer 800 may determine the queue limit as:

$$(a/b)*(c*d)*e*(f+g)$$

with:
a being the determined total number of chat requests that have arrived in the chat support queue 201 in the predefined time period,
b being the determined total number of chats in the chat support queue 201 that have been closed in the predefined time period,
c being the determined number of service agents present in the chat support,
d being the determined number of cases handled in parallel by each service agent present in the chat support queue 201,
e being the determined average number of chats handled per service agent in the chat support queue 201 in the further predefined time period,
f being the determined average waiting time per chat request in the chat support queue 201 before the processing of the respective chat request has been started, and
g being the determined average processing time per chat request in the chat support queue 201.

In other words, according to various embodiments, the queue limit for the chat support queue 201 (i.e. the dynamic queue limit) is calculated by applying Little's Law. Accordingly, the average number of items within a system is equal to the average arrival rate of items into and out of the system multiplied by the average amount of time an item spends in the system. According to various embodiments, Little's law has been adopted and applied to a multiple-server model concept so that the formula was further evaluated to cater for multiple-server scenarios. With the original formula L-αW, it was transformed to introduce some important metric factors that can be monitored and controlled in the chat support system 200 (particularly utilization and wait time).

Further, according to various embodiments, in case that in the method as described above the queue limit is determined to be equal to zero or to diverge, the method includes setting, by the server computer 800, the queue limit to be equal to the determined number of service agents present in the chat support.

For the purpose of determining the queue limit, the waiting time used for determine an average waiting time per chat request in the chat support queue 201 may be capped at a predefined value (e.g. 4 minutes). This does not guarantee that a waiting time for a respective (further) user 101 will always be below 4 minutes, but this may be applied as a factor in determining the queue limit to make sure that waiting time does not exceed the predefined value (e.g. 4 minutes) based on the heuristics used (e.g. past one hour heuristics).

For the purpose of determining the average processing time per chat request in the chat support queue 201, the time from the respective service agent 202 starting to process a respective chat request 203 as a chat until the respective service 202 agent closing the corresponding chat is determined.

Further, the server computer 800 may maintain a database 804 (e.g. a Redis database/cache). The server computer 800 may use the database 804 to monitor the chat support queue 201 and/or actions/events carried out by the service agents 202, e.g. on a time resolved basis. In other words, by the database 804 the server computer 800 may, e.g., be allowed to track the total number of chat requests that have arrived in the chat support queue 201 in the predefined time period, the total number of chats in the chat support queue 201 that have been closed in the predefined time period, the number of service agents present in the chat support, the number of cases handled in parallel by each service agent present in the chat support queue 201, the average number of chats handled per service agent in the chat support queue 201 in a further predefined time period. To this end, the server computer 800 may use the database 804 as a cache for the processing of the chat support requests 203 on basis of the service agents 202. For example, respectively after a predefined caching period, the server computer 800 may add a data element (e.g. a data bucket) to the database 804 including respective entries representative for chats having been processed by each service agent 202, wherein data is aggregated for the duration of the predefined caching period (i.e. on a so-called bucket level by so-called data-buckets). If, during a predefined caching period, no chat requests 203 have been processed and/or no chats have been closed, the server computer 800 may not add any data entry to the database 804 for this caching period. For example, the predefined caching period may be one minute. The server computer 800 may store the data elements in the database 804 for the predefined time period and/or the further predefined time period and the server computer 800 may delete the data elements after elapse of the predefined time period and/or the further predefined time period (e.g. after elapse of the longer one of these, e.g. after one hour). That is, the database 804 may only contain data representative for the predefined time period and/or the further predefined time period (e.g. for the past one hour).

As an example with a predefined caching period of one minute, the server computer 800 may (subsequently) add the following data entries to the database 804:

$2^{nd}$ minute: {"agent1": 1.5(chats), "agent2": 1(chat)}
$4^{th}$ minute: {"agent1": 2(chats)}
$5^{th}$ minute: {"agent2": 0.5(chats)}.

Here, the server computer 800 has not added any entries for/after the $1^{st}$ minute and the $3^{rd}$ minute. These entries may, e.g., represent the chats closed by the respective service agents. Based on these entries in the database 804, the server computer 800 may aggregate the values on an agent level in a map:

{"agent1": 3.5(chats), "agent2": 1.5(chats)}.

Then, the server computer 800 may determine the average by dividing by the number of agents:

$$5/2 = 2.5(chats).$$

Here, the number of chats may be in decimal since the formula 1/(older concurrency before ending chat) is used, by the server computer 800, when a chat is closed and it is aggregated on a minute level. This is done to make sure that, e.g., if a service agent is handling two concurrent chats, the eventual output is divided instead of counting it as two chats. The server computer 800 may update the data buckets as soon as a corresponding event occurs (e.g. starting to process a chat request, e.g. closing a chat), which allows the server computer 800 to determine the support queue limit (i.e. the dynamic queue limit) in real-time. For example, when a new chat request is processed by a service agent 202 (i.e. a new chat is initiated), the server computer 800 increases an arrived chat count for the corresponding service agent 202 by one. For example, when a chat is closed by a service agent 202, the server computer 800 increases a closed chat count for the corresponding service agent 202 by one. Further, by using, e.g., the Redis cache to store data and by running the determination/calculation, e.g., when a (further) user 101 opens an article, it is possible for the server computer 800 to get the support queue limit (i.e. the dynamic queue limit) with the most updated data and with no significant latency impact visible to the user 101.

Further, according to various embodiments, in case that in the method as described above the queue limit is determined to be equal to zero or to diverge, the method includes setting, by the server computer 800, the queue limit to be equal to the determined number of service agents present in the chat support. That is, in other words, in order to handle scenarios where it is, e.g., the start of day and there are no (e.g. not yet) served chats (i.e. closed chats) and the queue limit is (therefore) determined to be zero, a fallback value for a minimum queue limit is used, which (fallback value) is equal to a number of online agents (i.e. a number of service agents present in the chat support). This may also serve the purpose of making sure that customers (e.g. a (further) user 101) is not prevented from entering the chat support queue 201 when support agents are available (e.g. service agents presently not processing any chat requests are present in the chat support).

Further, according to an example, a service agent availability at a particular time of the day is taken into account for determining the queue limit for a chat support queue. This is to prevent that, when fewer service agents were scheduled to work or during peaks in chat support requests, the users wait for a long time (even for hours in some cases) before getting help.

Figure 7:
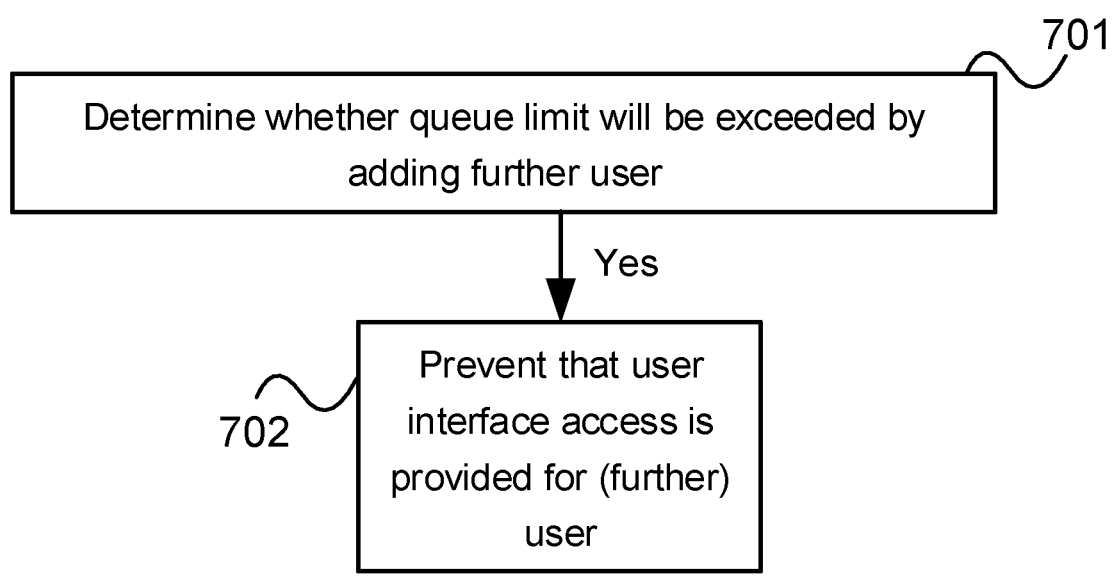
FIG. 7 is a flow diagram showing a method for controlling access to the chat support system according to one embodiment.

According to various embodiments, in summary, a method is provided as illustrated in FIG. 7.

FIG. 7 shows a flow diagram illustrating a method for controlling access to a chat support system, for example carried out by a server computer.

In 701, the server computer determines whether a queue limit for a chat support queue of the chat support system will be exceeded by adding a further user to the chat support queue.

In 702, the server computer prevents that a user interface access to the chat support system is provided for the further user in case it is determined that the queue limit for the chat support queue will be exceeded by adding the further user to the chat support queue.

Figure 8:
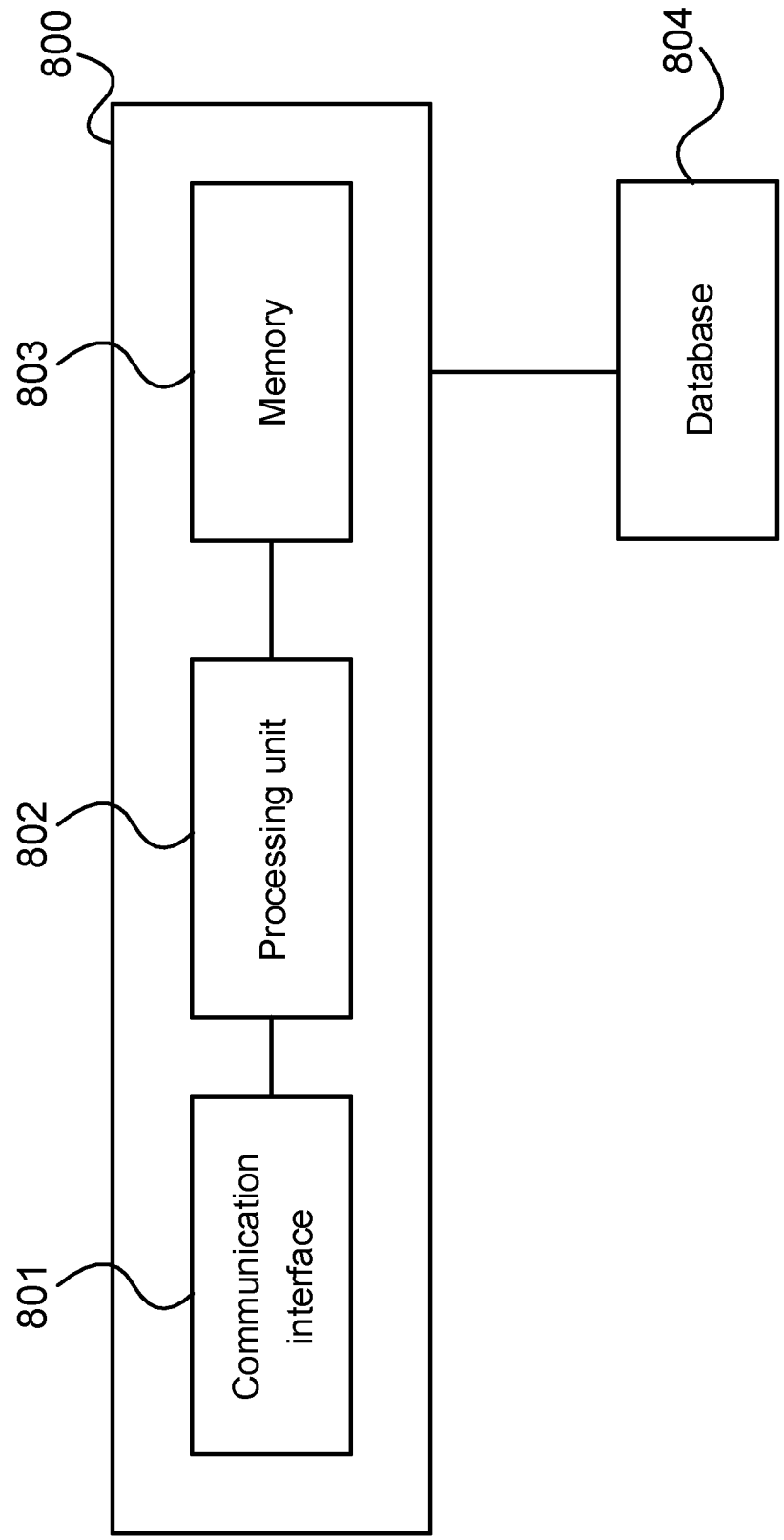
FIG. 8 shows a server computer according to an embodiment.

The method of FIG. 7 is for example carried out by a server computer as illustrated in FIG. 8.

FIG. 8 shows a server computer 800 according to an embodiment.

The server computer 800 includes a communication interface 801 (e.g. configured to receive a chat request, e.g. configured to transmit content provided by the server computer 800). The server computer 800 further includes a processing unit 802 and a memory 803. The memory 803 may be used by the processing unit 802 to store, for example, data to be processed, such as information about a chat request or information about the chat support queue 201. The server computer 800 is configured to perform the method as described above.

The methods described herein may be performed and the various processing or computation units and the devices and computing entities described herein may be implemented by one or more circuits. In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor. A "circuit" may also be software being implemented or executed by a processor, e.g. any kind of computer program, e.g. a computer program using a virtual machine code. Any other kind of implementation of the respective functions which are described herein may also be understood as a "circuit" in accordance with an alternative embodiment.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A computer-implemented method for controlling access to a chat support system, the method comprising:
   determining whether a queue limit for a chat support queue of the chat support system will be exceeded by adding a further user to the chat support queue; and
   preventing that a user interface access to the chat support system is provided for the further user in case it is determined that the queue limit for the chat support queue will be exceeded by adding the further user to the chat support queue, wherein preventing that the user interface access to the chat support system is provided for the further user comprises non-displaying on a display of a client device used by the further user, a user interface portion, wherein operation of the user interface portion triggers adding the further user to the chat support queue.

2. The method of claim 1, further comprising:
   providing the user interface access to the chat support system to the further user in case it is determined that the queue limit for the chat support queue will not be exceeded by adding the further user to the chat support queue.

3. The method of claim 2, wherein providing the user interface access to the chat support system to the further user comprises displaying on a display, a user interface portion, wherein operation of the user interface portion triggers adding the further user to the chat support queue.

4. The method of claim 1, wherein non-displaying the user interface portion on the display comprises not showing anything on the display and/or an user interface related to initiating a chat, wherein the user interface portion is part of the user interface.

5. The method of claim 1, further comprising:
   determining the queue limit for the chat support queue based on
   a total number of chat requests that have arrived in the chat support queue in a predefined time period; and/or
   a total number of chats in the chat support queue that have been closed in a predefined time period.

6. The method of claim 1, further comprising:
   determining the queue limit for the chat support queue based on a total number of chat requests that have arrived in the chat support queue in a predefined time period divided by a total number of chats in the chat support queue that have been closed in the predefined period.

7. The method of claim 1, wherein the chat support queue comprises at least one chat request input by a user, and the method further comprising:
   determining a number of service agents present in the chat support, wherein each service agent processes a chat request of the at least one chat request; and
   determining the queue limit for the chat support queue based on the determined number of service agents.

8. The method of claim 7, further comprising:
   determining a number of cases handled in parallel by each service agent present in the chat support queue; and
   determining the queue limit for the chat support queue based on the determined number of service agents and the determined number of cases handled in parallel by each service agent.

9. The method of claim 7, further comprising:
   determining an average number of chats handled per service agent in the chat support queue in a further predefined time period; and
   determining the queue limit for the chat support queue based on the determined average number of chats handled per service agent.

10. The method of claim 1, further comprising:
    determining an average waiting time per chat request in the chat support queue before the processing of the respective chat request has been started; and
    determining the queue limit for the chat support queue based on the determined average waiting time per chat request in the chat support queue.

11. The method of claim 1, further comprising:
    determining an average processing time per chat request in the chat support queue; and
    determining the queue limit for the chat support queue based on the determined average processing time per chat request in the chat support queue.

12. The method of claim 1, wherein the chat support queue comprises at least one chat request input by a user, the method further comprising:
    determining a total number of chat requests that have arrived in the chat support queue in a predefined time period;
    determining a total number of chats in the chat support queue that have been closed in a predefined time period;

determining a number of service agents present in the chat support, wherein each service agent processes a chat request of the at least one chat request;

determining a number of cases handled in parallel by each service agent present in the chat support queue;

determining an average number of chats handled per service agent in the chat support queue in a further predefined time period;

determining an average waiting time per chat request in the chat support queue before the processing of the respective chat request has been started;

determining an average processing time per chat request in the chat support queue;

determining the queue limit as: $(a/b)*(c*d)*e*(f+g)$ with:

a: the determined total number of chat requests that have arrived in the chat support queue in the predefined time period;

b: the determined total number of chats in the chat support queue that have been closed in the predefined time period;

c: the determined number of service agents present in the chat support;

d: the determined number of cases handled in parallel by each service agent present in the chat support queue;

e: the determined average number of chats handled per service agent in the chat support queue in the further predefined time period;

f: the determined average waiting time per chat request in the chat support queue before the processing of the respective chat request has been started; and g: the determined average processing time per chat request in the chat support queue.

13. A server computer comprising a communication interface, a memory interface and a processing unit configured to perform the method of claim 1.

14. A computer program element comprising program instructions, which, when executed by one or more processors, cause the one or more processors to perform the method of claim 1.

15. A computer-readable medium comprising program instructions, which, when executed by one or more processors, cause the one or more processors to perform the method of claim 1.

* * * * *